No. 772,388. PATENTED OCT. 18, 1904.
T. A. WARNER.
MECHANICAL MOVEMENT.
APPLICATION FILED JULY 31, 1903.
NO MODEL. 2 SHEETS—SHEET 1.

Witnesses:
Nathan C. Lombard 2nd
Edna C. Cleveland

Inventor:
Thomas A. Warner,
by N. C. Lombard
Atty.

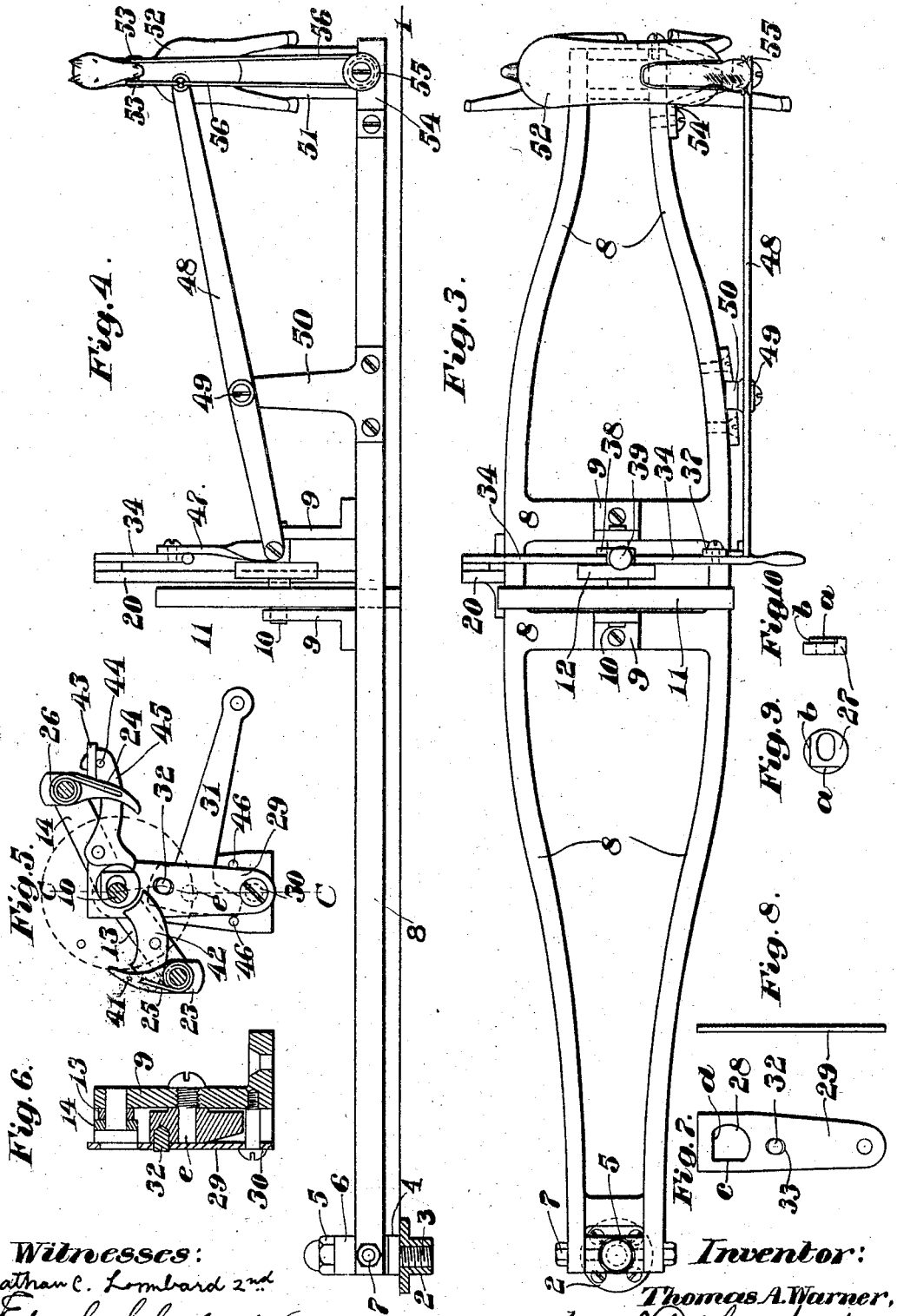

No. 772,388. Patented October 18, 1904.

UNITED STATES PATENT OFFICE.

THOMAS A. WARNER, OF CAMBRIDGE, MASSACHUSETTS.

MECHANICAL MOVEMENT.

SPECIFICATION forming part of Letters Patent No. 772,388, dated October 18, 1904.

Application filed July 31, 1903. Serial No. 167,665. (No model.)

*To all whom it may concern:*

Be it known that I, THOMAS A. WARNER, of Cambridge, in the county of Middlesex and State of Massachusetts, have invented an Improved Mechanical Movement, of which the following, taken in connection with the accompanying drawings, is a specification.

My invention relates to a mechanical movement; and it consists in certain novel features of construction, arrangement, and combination of parts, which will be readily understood by reference to the description of the accompanying drawings and to the claims hereto appended, and in which the invention is clearly pointed out.

Figure 1:
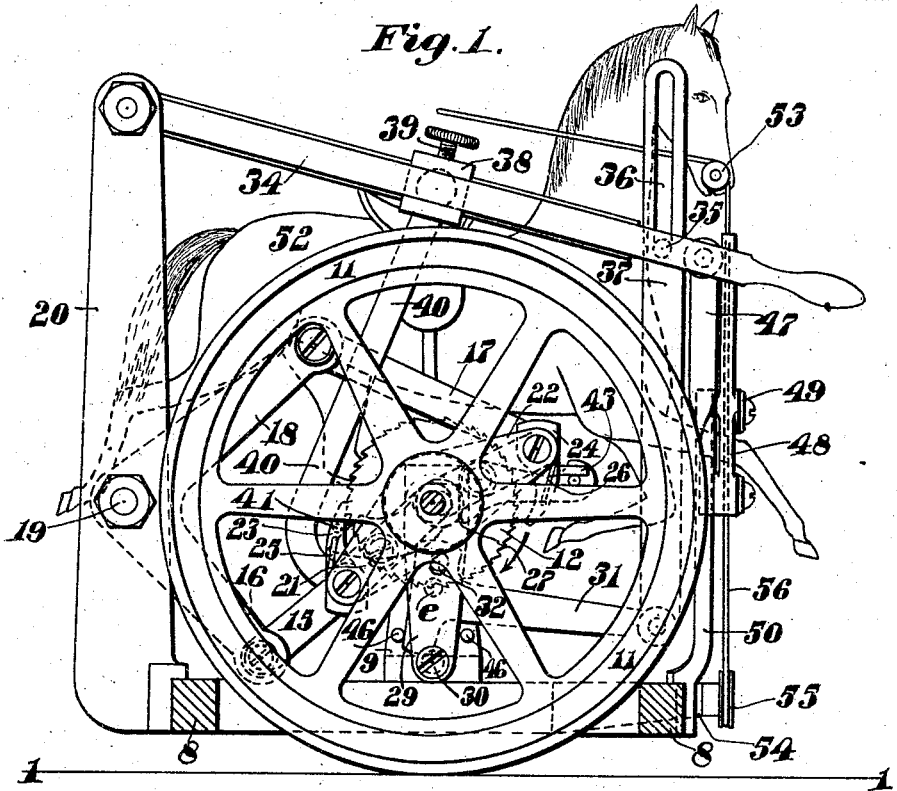
Figure 2:
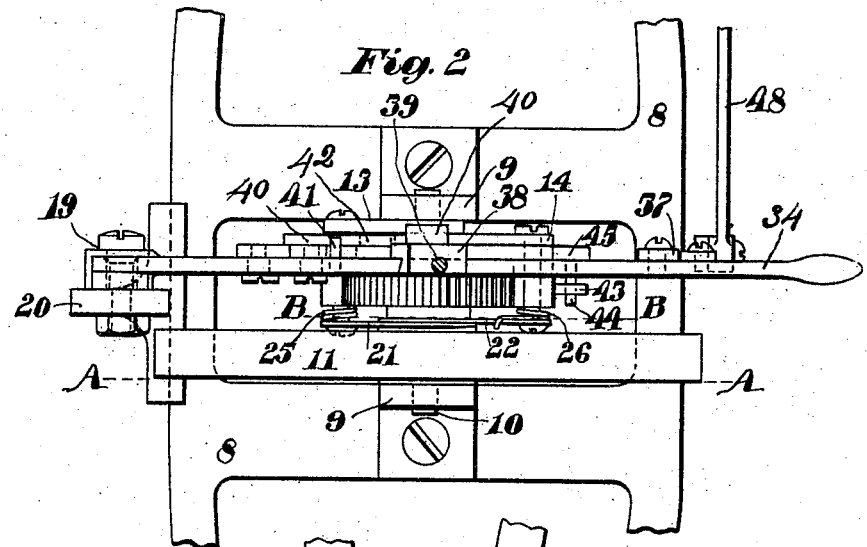
Figure 2:
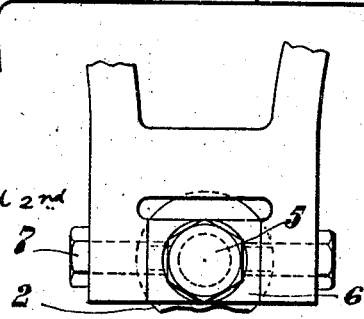

Figure 1 of the drawings is a sectional elevation of a machine embodying my invention, the cutting-plane being on line A A on Fig. 2 looking toward the top of said figure. Fig. 2 is a partial plan of the same, a portion of the base-frame between its pivotal end and the supporting-wheel, as well as the opposite end, being broken away. Fig. 3 is a plan of the base-frame with the horse and the more prominent parts of the operating mechanism mounted thereon, but reduced to one-half the scale of Figs. 1 and 2. Fig. 4 is a side elevation of Fig. 3. Fig. 5 is a partial sectional elevation, the cutting-plane being on line B B on Fig. 2, with the ratchet-wheel removed and its outline only being indicated by a dotted circle. Fig. 6 is a vertical section on line C C on Fig. 5. Figs. 7 and 8 are respectively a rear elevation and an edge view of the pawl-disengaging lever, and Figs. 9 and 10 are respectively a rear elevation and an edge elevation of a slotted disk carried by said pawl-disengaging lever.

In the drawings, 1 represents the upper surface of the bed or floor upon which the machine is supported and in which is secured in a fixed position the flanged socket 2, in which is screwed the stud 3, provided with a collar 4, the lower shoulder of which rests upon the upper surface of said socket, and with a male screw-thread at its upper end to receive the nut 5, and said stud 3 has mounted thereon between said nut and collar the sleeve 6, a portion of which is rectangular as viewed in plan, and has pivoted thereto by pivot-pins 7 one end of the radius beam or frame 8, which has secured thereon in fixed positions intermediate of its ends two upwardly-projecting stands 9 9, which have mounted in bearings in their upper ends the shaft 10, upon which is firmly secured the wheel 11 and the ratchet-wheel 12 and has loosely mounted thereon the inner ends of the radius-arms 13 and 14, to the outer or movable ends of which are pivoted the toggle-links 15 and 17, respectively, the opposite ends of which are pivoted to the arms 16 and 18, respectively, of an elbow lever mounted upon a fixed fulcrum-pin 19, set in the standard 20, as shown. The pivot-pins by which the arms 13 and 14 are connected to the toggle-links 15 and 17 extend beyond said toggle-links and through the supplementary radius-arms 21 and 22, which are also mounted loosely on said shaft 10 and serve to support the ends of said pins opposite to the arms 13 and 14 and have respectively mounted thereon the pawls 23 and 24, the points of which are normally pressed into engagement with the teeth of the ratchet-wheel 12 by the springs 25 and 26, which are coiled about said pins, and each has one end connected to its pawl and the other end engaging its supplementary radius-arm 21 or 22, as shown in Fig. 1. The shaft 10 also has loosely mounted thereon between the arms 13 and 14 and the ratchet-wheel 12 the slotted disk 27, which has formed upon one side thereof two shoulders $a$ and $b$ at right angles to each other, which shoulders are engaged by corresponding edges $c$ and $d$ of the opening 28 through the upper end of the lever 29, said lever being mounted upon and slightly movable about a stud 30, set in one of the stands 9, as shown in Figs. 1, 5, and 6.

A three-armed lever 31 is pivoted at $e$ to the same stand 9 in which is set the stud 30 and has formed upon or set in the upper short arm thereof a stud 32, which projects through the slightly-slotted hole 33 in the lever 29 and serves to vibrate said lever as said three-armed lever is moved about its axis of motion.

The upper end of the standard 20 has pivoted thereto one end of the lever 34, which has set therein near its movable end a stud 35, which passes through the slot 36, formed in the upper end of the link 37, the lower end of which is pivoted to the movable end of the long arm of the three-armed lever 31. The lever 34 has its two vertical sides parallel and its top and bottom edges beveled to give it a dovetailed shape in cross-section and has fitted thereto and adjustable endwise thereon the block 38, which may be secured in any desired adjusted position by the set-screw 39. The block 38 has pivoted thereto the upper end of the link 40, the lower end of which has a bearing on the same pin as the toggle-link 15, whereby an upward movement of the movable end of the lever 34 will cause an upward movement of both pawls 23 and 24, said pawl 23 engaging the teeth of the ratchet-wheel 12 and moving it about its axis in the direction indicated by the arrow on Fig. 1, while the pawl 24 is disengaged from said ratchet-wheel and moves upward preparatory to engaging said ratchet-wheel and moving it in the same direction when said lever 34 is moved downward.

The pawl 23 has set in its side a projecting stud or pin 41, with which the outer cam-shaped end of the short two-armed lever 42, pivoted to the arm 13 intermediate of its ends, engages to disengage said pawl from contact with said ratchet when said pawl has reached the extreme of its upward movement, said lever 42 being moved about its pivotal connection with the arm 13 by the contact with its inner end of the disk 27 as the upper end of the lever 29 and said disk are moved toward the left of Figs. 1 and 5. The pawl 24 has formed upon or set in its outer face an arm or stud 43, with which the pin 44, set in the outer end of the long arm of the lever 45, pivoted to the arm 14, engages to disengage said pawl from contact with said ratchet when said pawl has reached the extreme of its downward movement, said lever 45 being moved about its pivotal connection to said arm 14 by the contact with its short arm of the disk 27 as the upper end of the lever 29 and said disk are moved toward the right of Figs. 1 and 5. The engaging ends of the pawls 23 and 24 are moved outward to disengage them from the teeth of the ratchet-wheel against the tensions of the springs 25 and 26, which tend to maintain said pawls in engagement with said ratchet till said tensions are overcome. The movement of the three-armed lever 31 about its axis of motion is limited by suitable stops, as indicated by the pins 46, set in one of the stands 9, as shown in Fig. 1.

The movable end of the lever 34 has pivoted thereto the upper end of the link 47, the lower end of which is connected to one end of the lever 48, fulcrumed at 49 on the stand 50, as shown in Figs. 3 and 4.

The movable end of the radius beam or frame 8 has an upwardly-projecting standard 51 secured thereto, upon the upper end of which is supported in any suitable manner the dummy horse 50, which is provided on each side of its nose with a small sheave or pulley 53 in lieu of bits. The same end of said radius-beam 8 has secured thereto a stand 55, as shown in Figs. 1, 3, and 4.

The end of the long arm of the lever 48 has connected thereto one end of a suitable cord 56, which is passed downward therefrom to and partially around the sheave-pulley 55, then upward over one of the bit-sheaves backward to the saddle, then doubled in the form of a loop, then extends forward on the opposite side of the horse's neck over the other bit-sheave, and then downward and is made fast to said lever 48.

The operation of my invention is as follows: The several parts of the machine being in the same relative positions as shown in the drawings and it being desired to rotate the shaft 10 and wheel 11, power is applied to the free end of the lever 34 to move it, the link 40, and both pawls 23 and 24 upward, said pawl 23 being in engagement with the teeth of the ratchet-wheel and causing it, its shaft 10, and the wheel 11 to be partially rotated about the axis of said shaft 10 in the direction indicated by the arrow on Fig. 1, the extent of said partial rotation depending upon the position of the block 38 upon the lever 34. During this upward movement of the pawls the pawl 24 is disengaged from engagement with the ratchet-wheel 12 by the action of the disk 27 upon the short arm of the lever 45 and the engagement of the pin 44 with the arm or stud 43, set in or formed upon said pawl 24, which position is maintained until the stud 35, set in the movable end of said lever 34, has reached the upper end of the slot 36 in the upper end of the link 37, when a slightly farther upward movement of said lever 34 will cause an upward movement of the link 37 and the end of the long arm of the lever 31, whereby said lever 31 is moved about its axis, so as to move the upper end of the lever 29 toward the left of Figs. 1 and 5, thereby causing the disk 27 to act upon the lever 42 to move it about its axis, and thereby disengage the pawl 23 from contact with the ratchet-wheel by the cam-shaped outer end of said lever acting upon the stud or pin 41, and at the same time the removing of the disk 27 from contact with the short arm of the lever 45 permits the tension of the spring 26 to move said pawl 24 into engagement with the teeth of the ratchet 12. The operator then depresses the free end of the lever 34, whereby the link 40 and both pawls 23 and 24 are moved downward, said pawl 24 being in engagement with the teeth of said ratchet-wheel 12, thereby causing a further partial rotation of said ratchet and the wheel 11 in the same direction as before, pawl 23 during said downward movement being held out of engagement with said ratchet by the pressure of the disk 27 upon the inner end of the lever 42 until the stud 35 comes in contact with the lower end of the slot 36 in the link 37, when a slightly-additional downward movement of the end of the long arm of lever 34 will cause the pawl 24 to be disengaged from contact with said ratchet and the pawl 23 to be thrown into engagement with said ratchet by the movements of the levers 31 and 29 about their axes. These movements may be continued indefinitely by alternately pulling upon the right and left portions of the bridle-rein loop, and thus a continuous rotation be imparted to the supporting-wheel 11 and a continuous movement of the radius-beam 8 about its pivotal stud 3, carrying at its outer or movable end the horse and its rider in a circle having a diameter equal to twice the length of said radius-beam, which may be made of any desired length, according to the place where it is to be used. The speed with which a person may ride may be regulated by adjusting the block 38 along the lever 34 from a point in close proximity to the link 37 to a point directly opposite the pivotal connection of said lever with the standard 20, at which point of adjustment no motion of the pawls will take place, and consequently the radius-beam 8 and the horse and rider carried thereby will remain stationary regardless of any pulls upon the bridle-loop of the cord 56.

Aside from the use of my invention as a riding toy or merry-go-round the ratchet-and-pawl mechanism and the means for operating and controlling the action of said pawls are applicable to use in other lines of machinery where a continuous rotary motion is desired to be produced from a vibratory or a reciprocatory movement.

What I claim as new, and desire to secure by Letters Patent of the United States, is—

1. The combination with a shaft to be revolved, of a ratchet-wheel firmly secured thereon; a pair of arms 13 and 14 mounted loosely on said shaft; a pawl pivotally mounted on the movable end of each of said arms with their operating ends pointing in opposite directions and arranged to engage said ratchet on opposite sides thereof; an elbow-lever mounted on a fixed fulcrum; a link connecting one arm of said lever to the movable end of the arm 13; a similar link connecting the other arm of said lever to the movable end of the arm 14; means for vibrating said elbow-lever about its fulcrum to move said pawls toward and from each other around said ratchet-wheel; the short cam-lever pivoted to the arm 13; a pin or lug projecting from the pawl 23 in position to be engaged by the outer cam-shaped end of said short lever; the lever 45 pivoted to the arm 14; a pin or lug projecting from the end of the long arm of said lever; a pin or lug projecting from the pawl 24 in position to be engaged by the pin or lug of the lever 45; means for alternately acting upon said levers 42 and 45 to disengage said pawls from engagement with said ratchet; and springs connected to said pawls and arranged to normally press said pawls into engagement with said ratchet-wheel.

2. The combination of the shaft 10; the wheel 11 and the ratchet-wheel firmly secured thereon; the arms 13 and 14 mounted loosely on said shaft; the pawls 23 and 24 pivoted to the movable ends of said arms 13 and 14 respectively; the supplementary radius-arms 21 and 22 mounted loosely on said shaft and connected at their movable ends to the pawl-carrying pins; the springs 25 and 26 connecting said pawls and supplementary radius-arms 21 and 22; an elbow-lever mounted on a fixed fulcrum; links connecting the arms of said elbow-lever to the radius-arms 13 and 14; the operating-lever 34 fulcrumed on a fixed portion of the machine; the block 38 adjustably mounted on said lever 34; the link 40 connecting said block and the movable end of the radius-arm 13; the levers 42 and 45 pivoted respectively to the radius-arms 13 and 14 intermediate of their ends; the pins 41 and 43 projecting from the pawls 23 and 24 respectively; the pin 44 projecting laterally from the lever 45; the lever 29 pivoted at its lower end to a fixed part of the machine and carrying at its upper end a circular disk or hub 27; the three-armed lever 31 provided with the stud 32 which engages a slot in the lever 29 to vibrate it; the link 37 pivoted at its lower end to the lever 31 and provided at its upper end with the slot 36; and the stud 35 set in the lever 34 and engaging said slot 36.

In testimony whereof I have signed my name to this specification, in the presence of two subscribing witnesses, on this 29th day of July, A. D. 1903.

THOMAS A. WARNER.

Witnesses:
 N. C. LOMBARD,
 GEORGE H. BROWN.